March 25, 1941.                M. IRELAND                2,236,405
                              ADJUSTABLE TIMER
                     Filed Jan. 19, 1940          3 Sheets-Sheet 1
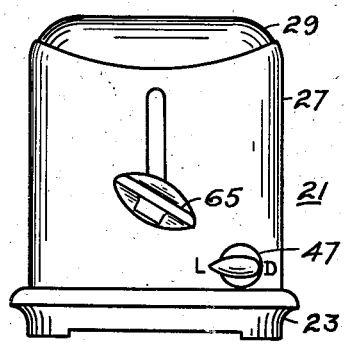
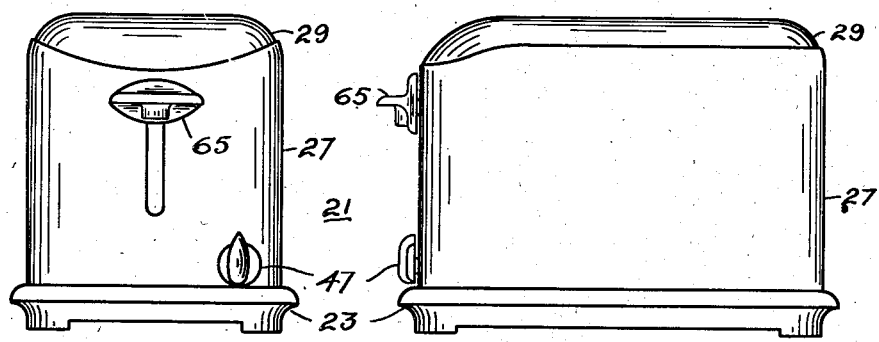
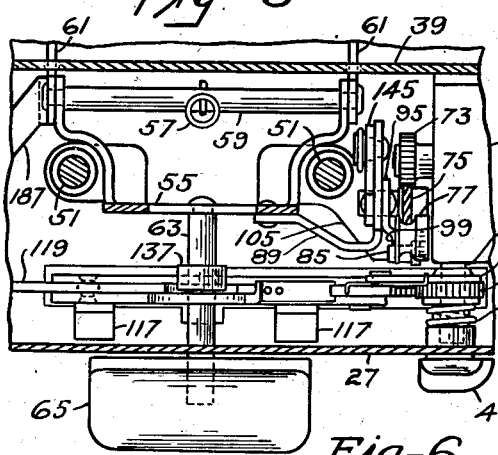
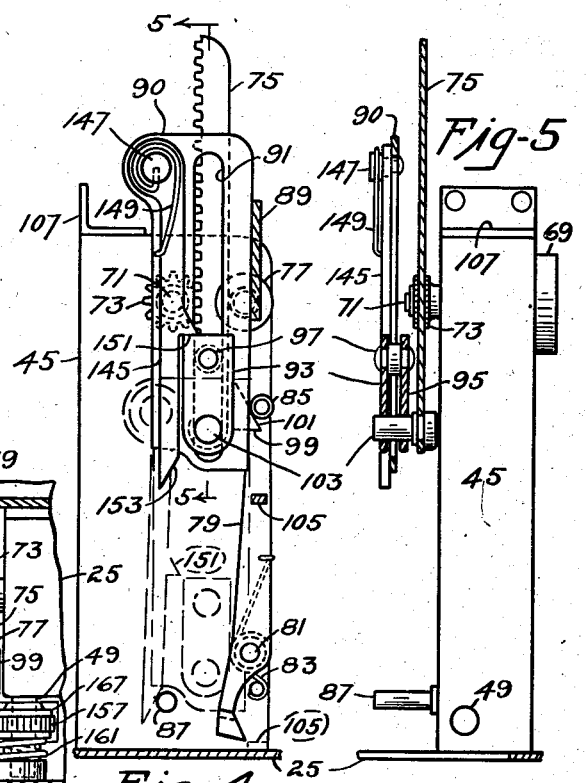
INVENTOR
MURRAY IRELAND
BY
ATTORNEY March 25, 1941.  M. IRELAND  2,236,405
ADJUSTABLE TIMER
Filed Jan. 19, 1940   3 Sheets-Sheet 2
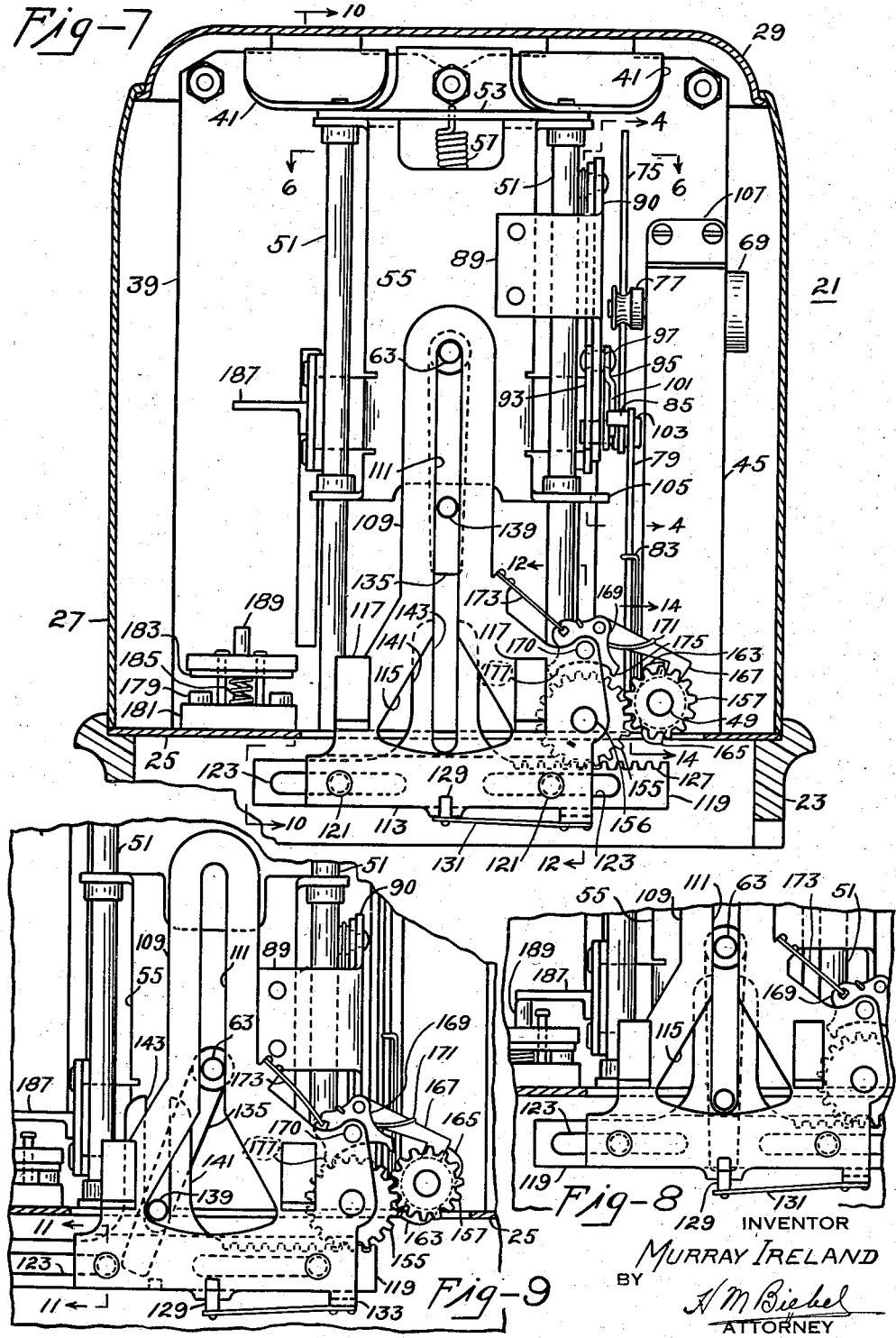
INVENTOR
MURRAY IRELAND
BY
ATTORNEY

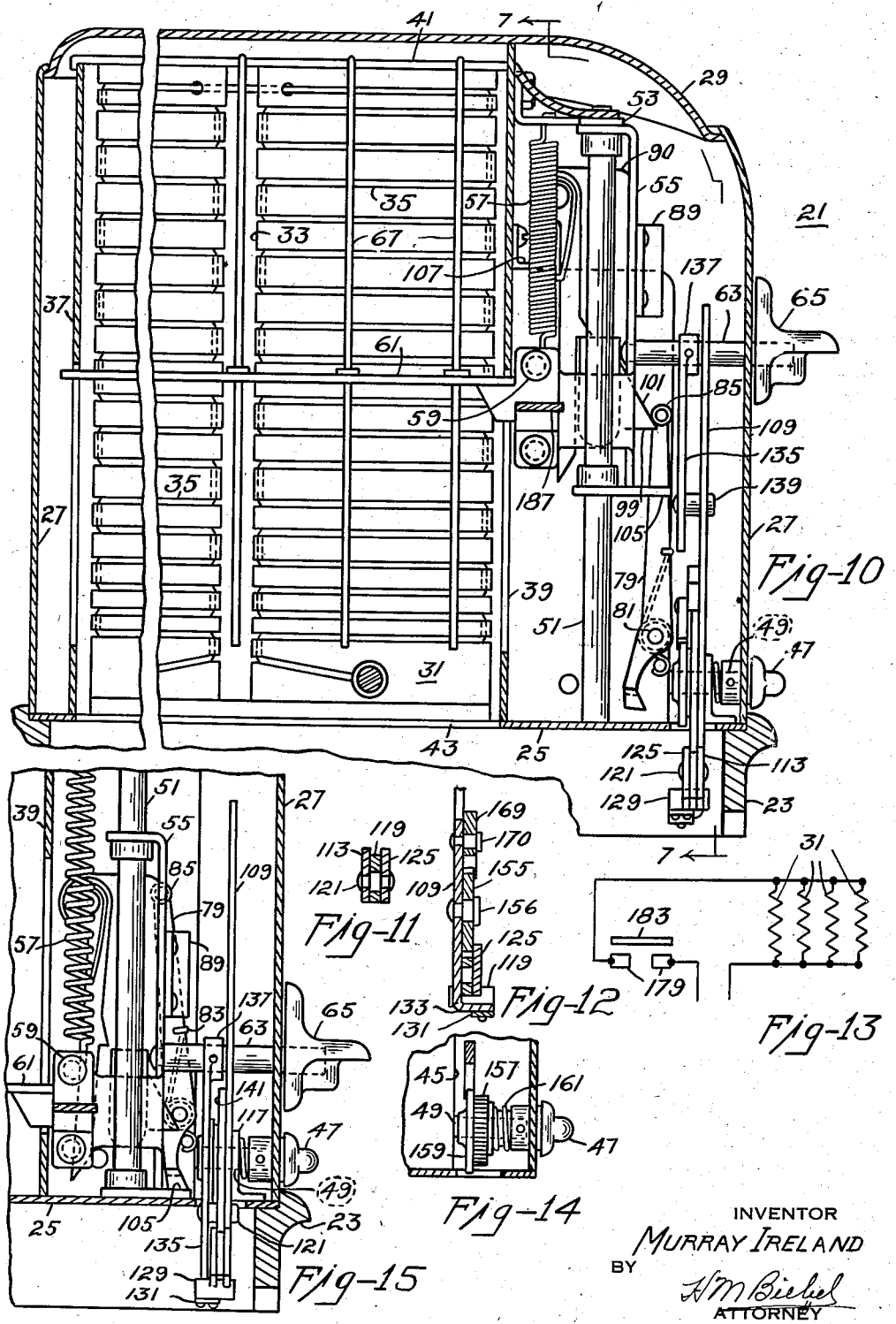

Patented Mar. 25, 1941

2,236,405

UNITED STATES PATENT OFFICE

2,236,405

ADJUSTABLE TIMER

Murray Ireland, near Elgin, Ill., assignor to McGraw Electric Company, Elgin, Ill., a corporation of Delaware Application January 19, 1940, Serial No. 314,627

9 Claims. (Cl. 161—16)

My invention relates to mechanical timers and particularly to means for selectively varying the normal speed of operation thereof.

An object of my invention is to provide a variable speed mechanical timer mounted on a heat treating appliance or on a toaster, with means for selectively increasing or decreasing the speed of operation thereof for a heat treating or a toasting operation.

Another object of my invention is to provide an adjustable speed timer mounted on a toaster with means controlled by a knob effecting initiation of a toasting operation, for causing the speed of operation of the timer to be selectively varied from its normal setting, after the timer has been fully wound.

Another object of my invention is to provide a timer speed adjusting means operable only after the timer has been fully wound to either increase or decrease the speed of operation, which speed adjusting means is returnable to its initial position at the end of a cycle of operation.

Other objects of my invention will either be apparent from a description of one form of device embodying my invention or will be pointed out in the course of such description and more particularly set forth in the appended claims.

In toasters equipped with adjustable mechanical timing devices it is customary to provide a manually operable knob to adjust the timer so that when the knob is in one extreme position dark toast is produced, and when the knob is in the other extreme position, light toast is produced and obviously with the knob in intermediate positions, any degree of toasting between these extremes is obtained. A user of such a toaster will, after a few trials, set the knob at a position where toasting of a degree satisfactory to him is obtained. However, a second user wishing darker or lighter toasting will change this setting resulting in inconvenience to the first user or to other users who will have to again readjust the knob. My invention overcomes this by providing a means whereby the second user can selectively adjust the timer for light or dark toast without interference with the first user's setting.

In the drawings,

Figure 1 is a front elevational view, on a reduced scale, of a toaster embodying my invention, Fig. 2 is a view in side elevation thereof, Fig. 3 is a view similar to Fig. 1 but showing the actuating knob in operating position and turned in one direction to vary the duration of operation from the normal, Fig. 4 is a fragmentary view showing the timer main mechanism, the view being taken on the line 4—4 of Fig. 7, Fig. 5 is a view of the parts shown in Fig. 4 and taken on the line 5—5 of Fig. 4, Fig. 6 is a horizontal sectional view of parts of the toaster and taken on the line 6—6 of Fig. 7, Fig. 7 is a front view of a mechanism chamber of a toaster, taken on the line 7—7 of Fig. 10, Fig. 8 is a fragmentary front elevational view showing auxiliary controlling timer elements in toasting position and adjusted for normal speed operation, Fig. 9 is a fragmentary view substantially the same as Fig. 8 but showing the auxiliary timer controlling elements in positions after the timer has been adjusted to other than its normal operating speed, Fig. 10 is a view in vertical side elevation taken on the line 10—10 of Fig. 7 and showing all parts in non-toasting position substantially the same as illustrated in Fig. 7, Fig. 11 is a fragmentary view in section and taken on the line 11—11 of Fig. 9, Fig. 12 is a fragmentary sectional view taken on the line 12—12 of Fig. 7, Fig. 13 is a diagram of connections for the main heating elements and the main control switch, Fig. 14 is a fragmentary view taken on the line 14—14 of Fig. 7, and Fig. 15 is a fragmentary vertical sectional view similar to Fig. 10 but showing parts in toasting position similar to Fig. 8 of the drawings.

I have elected to illustrate a toaster designated generally by 21, which toaster may include a moulded composition skeleton frame 23 having a base plate 25 suitably secured against a top surface thereof. A casing 27 includes front, rear and side walls. The casing 27 is open at its bottom and at its top and may have its lower edges secured against the bottom plate 25 in a manner well known in the art and not shown in the drawings. A cover 29 closes the otherwise open top of the casing 27, all in a manner well known in the art.

I have elected to illustrate my invention as applied to a two-slice toaster and the toaster structure includes in addition to the parts already hereinbefore enumerated, two pairs of electric heating elements 31, each pair of planar vertically-extending heating elements being spaced apart to receive therebetween a slice of bread which is to be toasted. Each of these heating elements 31 includes one or more pieces of mica 33 on which is mounted or wrapped a resistor strip 35, all in a manner well known in the art and reference may be had to Ireland Patent No. 2,001,362 for further details as to a toaster of this general structure.

The toaster structure includes further a rear intermediate sheet metal wall 37 and a front intermediate sheet metal wall 39, which front and rear walls may be held at their bottom edges against the base plate 25 in any suitable or desired manner while their top edges may partly interfit with longitudinally-extending top frame plates 41, two of which are provided for a two-slice toaster.

The base plate 25 may be provided with a plurality of slots 43, the number of these slots being the same as that of the number of slices of bread toastable at the same time in the toasting chamber constituted by the outermost heating elements and the front and the rear intermediate walls. The cover 29 and the top frame plates 41 may be provided with registering slots through which slices of bread may be put into the toasting chamber and removed therefrom when toasted.

Means for controlling the duration of a toasting operation may include a variable or adjustable speed mechanical timer 45 of the kind more particularly disclosed and claimed in my Patent No. 1,866,808 although not limited to the particular details of construction disclosed and claimed in this patent. As set forth in my Patent No. 1,866,808, a timer of this kind may be provided with a speed adjusting knob 47 mounted on a shaft 49 which shaft extends into the timer casing and is connected to the timer mechanism in such manner that turning the knob 47 in one direction will vary the timer mechanism to cause it to operate at a lower speed, while turning the knob in the opposite direction will vary the timer mechanism to cause it to operate at a higher speed. Reference may be had to Patent No. 1,866,808 for the precise manner in which turning movement of the adjusting knob will cause a change in the speed of operation of the timer and therefore a change in the duration of a toasting operation.

In order to provide means whereby an operator may initiate a toasting operation, I provide a pair of vertical standards 51, the lower ends of which interfit with the base plate 25 while the upper ends thereof may interfit with front end portions of the top frame plates 41 and a bar 53 may be provided to increase the rigidity of the structure, the upper ends of the standards extending through openings in bar 53.

A carriage plate 55 is slidably mounted on the two standards 51 and may be moved vertically upwardly and downwardly, being biased to an upper or non-toasting position by a coil spring 57, the lower end of which is connected to a cross bar 59 connected to rearwardly-extending portions of the carriage 55, while the upper end of the coil spring 57 may be connected to the bar 53. Bread carriers 61, equal in number to the number of pairs of heating elements, have rear and front end portions extending through the rear intermediate wall 37 and the front intermediate wall 39, with the front end portions connected to the rearwardly-extending parts of the carriage 55 to which cross bar 59 is attached, the construction being such that the carriers 61 are mechanically connected with the carriage 55 by the cross bar 59.

The carriage 55 has secured thereto a forwardly-extending rod 63 which rod extends outwardly through a slot in the front wall of the casing 27 and has mounted thereon a knob 65 so that an operator may press downwardly on the knob and move the carriage and other parts connected thereto and to be described hereinafter, into a lower position where the bread carriers 61 will be in what is usually called their toasting positions.

Guide or guard rods 67 of the usual kind may be suspended from the top frame plates 41 and slidably interfit with the carriers 61, being positioned between the heating element and a slice of bread located on a carrier to hold a slice of bread in substantially central position between the spaced pair of heating elements effecting toasting of the slice of bread by high temperature radiant heat.

The timer 45 is provided with a spring 69 mounted on an arbor 71 extending through the timer casing and having a pinion 73 mounted thereon at the side of the timer opposite to that against which spring 69 is located. A rack bar 75 meshes with the pinion 73 and is maintained in meshing engagement therewith by a grooved roller 77, all in a manner set forth in my Patent No. 1,866,808. The timer 45 has mounted thereon a detent lever arm 79 pivotally supported on a pivot pin 81 near the lower end of arm 79, a small spring 83 biasing lever arm 79 in a counter-clockwise direction. A laterally-extending pin 85 is mounted on the upper end of arm 79 for a purpose to be hereinafter set forth. The timer 45 has also mounted thereon on the same side on which detent lever arm 79 is mounted, a pin 87 near the bottom end of the timer for a purpose to be hereinafter mentioned.

As it is desired that the timer be wound when an operator moves knob 65 and the parts connected therewith downwardly, I provide a bracket 89, of L-shape, secured to the carriage 55, the main portion 90 of the bracket 89 extending substantially longitudinally of the toaster closely adjacent to the right-hand vertical standard and to the right or outside of this standard. The portion 90 is provided with a vertical slot 91 in which there is movably mounted an assembly consisting of a short vertically-extending plate 93 on one side of the member 90 and a second short plate 95 positioned on the other side of portion 90, these two plates being connected by a pin 97 located therein adjacent the upper end of the two plates. The shape of plate 93 is substantially rectangular and is shown as having a flat upper end and a rounded lower end. Plate 95 has a forwardly-extending portion 99 which provides a cam surface 101 which cam surface is adapted to engage the pin 85 on detent 79 under certain operating conditions to be hereinafter described. The lower ends of plates 93 and 95 have extending therethrough a pin 103 secured to the lower end of rack bar 75 so that the two plates 93 and 95 will move the rack bar 75 down when an operator presses on knob 65 by means to be hereinafter described. When the rack bar is moved upwardly by the timer during its running-down operation, cam surface 101 will be moved into engagement with pin 85 on detent lever arm 79 at substantially the end of the operating period of the timer, to cause arm 79 to turn slightly in a clockwise direction, as seen in Fig. 4 of the drawings, to cause disengagement of its lower end from a projection 105 secured to or a part of the lower right-hand edge portion of carriage 55. When the operator moves the knob 65 downwardly as far as it can be made to move, projection 105 will ride over an edge portion of detent lever arm 79 and then under its lower edge to be held there during a toasting operation and until released therefrom as hereinbefore described. The timer 45 may be held in its proper operative position against the front intermediate wall 39 by a bracket 107 in a manner now well known in the art.

A vertical plate 109 is located between the front intermediate wall 39 and the front wall of the casing 27. Its upper end is relatively narrow and has a vertical slot 111 therein. Its bottom portion 113 is wider than its upper end portion and extends below the base plate 25. A substantially triangular slot 115 is provided in portion 113 and connects with the lower end of slot 111. A pair of brackets 117, of L-shape, secured in any suitable or desired manner to the base plate 25 and the intermediate portion of plate 109, hold the plate 109 in its proper operative vertical position.

A horizontally movable timer-adjusting plate 119 is supported by the portion 113 hereinbefore described, on a pair of spaced pins 121 which pins are fixed in member 113 and extend through slots 123 in plate 119, there being provided a rear holding plate 125 held by the rivet pins 121 so that plate 119 may be moved horizontally relatively to the fixed plate 109 and particularly relatively to its lower portion 113. The upper edge of the right-hand portion of plate 119 is provided with teeth 127 for a purpose to be hereinafter set forth.

Plate 119 is normally locked in a given position relatively to its supporting plate 113 as by a small vertically-extending locking plate 129 which fits into a slot in the lower edge of a portion 113 and into slots in the lower edges of plates 119 and 125. The small plate 129 is held in locking position by a short leaf spring 131 which is secured to a small lug 133 constituting a part of plate 113 at its right-hand edge.

The shaft 63 has mounted thereon immediately back of plate 109, a depending lever arm 135 which has a collar 137 at its upper end fixedly secured on shaft 63, there being a laterally-projecting pin 139 mounted on arm 135 intermediate its ends but closer to the lower end thereof than to its upper end, this pin normally fitting in slot 111.

When the operator presses on knob 65 to move shaft 63 downwardly, the fit of pin 139 in slot 111 initially prevents any turning movement of the knob 65 and shaft 63 and only when pin 139 has been moved far enough downwardly to enter or be positioned in the triangular slot or aperture 115 will it be possible to turn arm 135. The plate 119 is provided at its upper end with two spaced arms 141 which are spaced apart by a slot 143 which slot normally is aligned with slot 111, the length of the arms 141 being such that they extend above the upper end of aperture 115 as shown more particularly in Figs. 7 and 8 of the drawings. When knob 65 has been pressed downwardly to its full extent so that projection 105 on carriage 55 has been moved under the detent lever arm 79, the lower end of arm 135 will have engaged the upper surface of lock plate 129 and will have moved it downwardly as is shown more particularly in Fig. 8 of the drawings so that lock plate 129 no longer holds plate 119 in its normally fixed initial position.

Means for causing winding up of the timer spring 69 includes a lever arm 145 pivotally mounted on and near the top of bracket portion 90 as by a pivot pin 147, the arm 145 being biased in a counter-clockwise direction, as seen in Fig. 4 of the drawings, by a small spring 149. Arm 145 is provided with a lug 151 of triangular shape at one edge or side thereof intermediate its ends and the lower end of arm 145 is provided with the angular extending cam surface 153. When the operator has moved the knob 65 downwardly to the full extent, cam surface 153 on arm 145 will have engaged fixed pin 87 and arm 145 will have been turned slightly in a clockwise direction so that lug 151 is disengaged from plate 93 by means of which engagement rack bar 75 was caused to move downwardly and wind the timer. The timer is now free to unwind with consequent slow upward movement of the rack bar and of the small plates 93 and 95 mechanically connected therewith as has hereinbefore been described. When cam surface 101 engages and turns lever arm 79, the bread carriers are released from their latched position and spring 57 causes upward movement thereof to terminate the toasting operation.

Assuming that the timer was adjusted to some desired speed of operation by means of the knob 47 and that the degree of toasting effected by such adjusted timer was the one desired by the present operator, no turning of the knob to vary the duration of a toasting operation was necessary. If, however, an operator should desire a different degree of toasting, either more or less than that for which the timer is normally and initially set by the knob 47, the operator would cause a turning movement of the knob 65 to say the position shown in Fig. 3 of the drawings. Since pin 139 was moved into slot 143 in plate 119, any turning movement of knob 65 whereby, for instance, shaft 63 is turned in a clockwise direction, would cause movement of plate 119 to the left as shown more particularly in Fig. 9 of the drawings, pin 139 striking or engaging the left-hand wall of aperture 115 as shown in Fig. 9 of the drawings, provided the operator causes sufficient turning movement of the knob. It is assumed that the operator will usually or normally cause such a degree of turning movement although it is obvious that a lesser degree of change of toasting effect can be obtained by a lesser turning movement of the knob and of the parts connected therewith which cause movement of plate 119.

The upper edge of the right-hand end portion of plate 119 which has the teeth 127 therein meshes with an intermediate pinion 155 rotatably supported by a pin 156 fixed in plate portion 113. This intermediate pinion 155 meshes with a pinion 157 mounted on shaft 49 on which adjusting knob 47 is mounted. Pinion 157 is loosely mounted on shaft 49 and is pressed against a pressure disk or plate 159 fixed on shaft 49 by a spring 161, the construction being such that the knob 47 fixed on shaft 49 causes turning movement of the shaft and causes turning movement of pinion 157 through the pressure plate 159 as hereinbefore described. It is thus evident that if the operator turns knob 47 to manually adjust the initial speed of the timer, he is permitted to do so even though pinion 155 is in mesh with pinion 157, and is locked in a given position because of its meshing engagement with normally locked plate 119. It is obvious, however, that if plate 119 is moved in either the left-hand or the right-hand direction, as hereinbefore described, pinion 155 and pinion 157 will be turned and the speed adjusting member normally operated by knob 47 will be operated in the desired direction and to the desired degree.

It is also necessary that further movement of the timer speed adjusting means be prevented, in a given direction, by the turning of the knob 65, if turning of the knob 47 has moved the timer speed adjusting means to either extreme position. To this effect I provide two diametrally-extending lugs 163 and 165 on pressure disk 159 and while these are shown as having diametrally spaced front flat edges, they may be located at another angle peripherally relatively to each other but since the extreme turning movement of knob 47 is through substantially only 180°, the two lugs 163 and 165 are made to extend substantially diametrally to each other as regards their front flat edges. A link 167, of substantially L-shape, is pivotally mounted on a small locking plate 169, which locking plate is pivotally mounted on plate 109 as by a pin 170, a small spring 171 pressing the hook end of member 167 against the peripheral surface of disk 159. A leaf spring 173 having one end mounted on an intermediate portion of plate 109 interfits with a part of plate 169 to maintain it in substantially the position shown in Fig. 7 of the drawings. Should an operator turn knob 47 in a clockwise direction to such an extent that lug 163 engages the inner face of the hook end of link 167, plate 169 will be turned in a clockwise direction so that a small lug 175 at the right-hand edge portion of plate 169 will move into one of the slots of pin 155 thereby preventing further turning movement of the pinion 155 in a counter-clockwise direction and indicating to an operator that he cannot cause further change in the timing of the toaster in a given direction.

A second lug 177 is provided at the left-hand edge of plate 169 and if the operator should turn knob 47 in a counter-clockwise direction until the front face of lug 165 engaged the outer end of link 167, he would turn plate 169 so that lug 177 would enter one of the slots on pinion 155 (see Fig. 9) thereby preventing turning movement of pinion 155 in a clockwise direction by means of the parts hereinbefore described as connected with shaft 63 and actuable by knob 65 when the same is turned.

Let it be assumed that the operator had turned knob 65 in a clockwise direction after moving it down so that the parts directly associated therewith were moved to the positions shown in Fig. 9 of the drawings and that the auxiliary timer speed adjustment was maintained throughout a cycle of operation. Rack bar 75 was then moved to its upper position as shown in Fig. 4 of the drawings, the cam surface 101 had engaged with pin 85 to cause turning movement of the detent lever arm 79 with the result that carriage 55 was moved upwardly quickly by spring 57. Pin 139 which had been in engagement with the left-hand edge or wall of the triangular aperture 115, was moved in a counter-clockwise direction so that shaft 63 was turned in a counter-clockwise direction, the pin 139 then entered slot 111 and moved upwardly therein to the position shown for instance in Fig. 7 of the drawings when all of the parts of the toaster were returned to their normal positions.

The same comments will apply if pin 139 had been moved in a counter-clockwise direction so that it was moved into engagement with the right hand wall of aperture 115, in which case pin 139 would have been moved to the left, to turn the shaft 63 slightly in a clockwise direction, the pin 139 then moving straight upwardly in slot 111.

It is therefore obvious that irrespective of whether the operator turned knob 65 in a clockwise or in a counterclockwise direction after he had initiated a toasting operation by moving the knob 65 downwardly to simultaneously wind the variable or adjustable speed timer, and to move the bread carrier into toasting position, return movement of these parts at the end of a toasting operation will return the timer to its initial or normal adjustment.

Since it is desirable that the heating elements hereinbefore described be energized only during a toasting operation, I provide fixed contact members 179 mounted on a plate 181 of electric-insulating material which may be secured against base plate 25, a contact bridging member 183 being operatively associated with the fixed contact members 179, the bridging member 183 being normally held out of engagement with the contact members 179 by a spring 185. I may mount a small bracket 187 at one side of the carriage 55, which bracket 187 will engage an upwardly extending lug 189 insulatedly mounted on bridging member 183, the bracket 187 engaging projection 189 and causing downward movement of the bridging member 183 into engagement with contacts 179, as shown in Figs. 8 and 9 of the drawings, so that downward movement of knob 65 will not only cause winding of the timer, movement of the bread carrier into toasting position, and engagement of projection 105 under the lower end of detent lever 79, but will also cause closing of the energizing circuit of the main heating element.

It is therefore obvious that the device embodying my invention provides a relatively simple means actuated by the timer-winding, carrier-moving and switch-closing member to selectively vary the speed setting of the timer, which varied speed setting of the timer is nullified at the end of every toasting operation. It is thus possible to obtain three different degrees of toasting effect as may be desired by three different operators, one such operator merely pressing down on the knob, without turning the same after having pressed it downwardly to the full and fixed distance, while the other operators need only press down the knob and then turn it in the one or in the other direction to obtain a lesser or a greater degree of toasting.

Various modifications may be made in the device embodying my invention without departing from the spirit or scope thereof and I therefore desire that all further modifications coming clearly within the scope of the appended claims are to be considered as being covered thereby.

I claim as my invention:

1. Means for varying the speed of a variable speed mechanical timer normally adapted to operate at a given speed to control the duration of a heat treating operation, said means including a knob movable in a given direction to effect winding of the timer and means actuable by the knob only at the end of its timer-winding movement for selectively varying the speed of operation of said timer to a higher or to a lower value than said given speed.

2. Means for varying the speed of a variable speed mechanical timer normally operable at a given speed to control the duration of a heat treating operation, said means including a knob movable in a given path to effect winding of the timer and normally locked means operable by selective turning movement of said knob at the end of said timer-winding movement to change the speed of operation of said timer to a higher or to a lower value than said given speed.

3. Means for varying the speed of a variable speed mechanical timer normally operable at a given speed to control the duration of a heat treating operation, said means including a knob adapted to be moved through a fixed distance in a given direction to effect winding of the timer, means to hold the knob in the position into which it has been moved, a speed-adjusting member connected with the timer, means actuable by the knob when it has been moved said fixed distance and connected with said speed-adjusting member for selectively moving the speed-adjusting member to change the speed of operation of the timer to a higher or to a lower value than said given speed and means to return the speed-adjusting member to its initial position at the end of a heat treating operation.

4. Means for varying the speed of a variable speed mechanical timer including a speed-varying member connected therewith to effect manual adjustment of the timer to cause it to operate at a desired speed to control the duration of operation of a heat treating operation, said means comprising a knob movable through a given distance in one direction to effect winding of the timer, a normally locked means operatively connected with said speed-varying member for actuating it to vary the operating speed of the timer, means connected with the knob movable therewith and thereby to engage and release said normally locked means and selectively move it by said knob to cause the timer to operate at a lower or at a higher speed than said initial speed during a heat treating operation and means to return the speed-varying member to its initial position at the end of a heat treating operation.

5. A device as set forth in claim 1 and including means for causing return of the knob-actuated speed-varying means to its initial position at the end of a heat treating operation.

6. Means for varying the speed of a variable speed mechanical timer having a speed-varying member connected therewith to effect manual adjustment of the timer to cause it to operate at a desired speed to control the duration of a heat treating operation, said means comprising a knob spring-biased to a first position and movable to a second position through a fixed distance to wind said timer, a detent for holding said knob in its second position until released by the timer, a lever arm secured to said knob movable therewith and turnable thereby, means preventing turning of said lever arm by said knob until the knob has been moved substantially into its second position, means operatively connected with said speed-varying member engaged by said lever arm when the knob is in its second position and selectively operable by turning of the knob in one or the other direction to vary the position of the speed-varying member to cause the timer to operate at a higher or a lower speed during a heat treating operation and means operatively engaging said lever arm during the return of the knob to its first position for causing the speed-varying member to be returned to its initial position.

7. A device as set forth in claim 3 and including means controlled by said speed-adjusting member for preventing movement of the means connected to the speed-adjusting member by the knob when the speed-adjusting member has been moved to a limiting position in one direction.

8. Means for varying the speed of operation of an adjustable speed mechanical timer adapted to operate at a given speed to control the duration of a heat treating operation, and including a speed-adjusting member connected with the timer to set its speed to a given value, said means including a knob moveable through a fixed distance in a given direction to wind said timer and initiate a heat treating operation and means actuable by the knob only at the end of its timer-winding movement for causing movement of said speed-adjusting member to selectively vary the speed of operation of the timer to a higher or to a lower value than said given value.

9. Means for varying the speed of operation of an adjustable speed mechanical timer adapted to operate at a given speed to control the duration of a heat treating operation, and including a speed-adjusting member connected with the timer to set its speed to a given value, said means including a knob movable through a fixed distance in a given direction to wind said timer and initiate a heat treating operation, means actuable by the knob only at the end of its timer-winding movement for causing movement of said speed-adjusting member to selectively vary the speed of operation of the timer to a higher or to a lower value than said given value and means operable only at the end of a heat treating operation for causing return of the speed-adjusting member to its initial position.

MURRAY IRELAND.